(12) United States Patent
Peetz et al.

(10) Patent No.: US 7,252,860 B2
(45) Date of Patent: Aug. 7, 2007

(54) PROCESS FOR PRODUCING A HIGH TEMPERATURE STABLE FIBER REINFORCED CERAMIC

(75) Inventors: Kilian Peetz, Dasing (DE); Angelika Froehlich, Eisenhofen (DE); August Muehlratzer, Munich (DE)

(73) Assignee: MAN Technologie AG, Augsburg (DE)

( * ) Notice: Subject to any disclaimer, the term of this patent is extended or adjusted under 35 U.S.C. 154(b) by 158 days.

(21) Appl. No.: 10/053,211

(22) Filed: Jan. 15, 2002

(65) Prior Publication Data

US 2002/0132046 A1    Sep. 19, 2002

(30) Foreign Application Priority Data

Jan. 15, 2001  (DE) ................................ 101 01 546

(51) Int. Cl.
*C23C 16/00*    (2006.01)
(52) U.S. Cl. .................... 427/255.12; 427/255.18; 427/255.24; 427/249.2; 427/249.3
(58) Field of Classification Search ............ 427/248.1, 427/249.1, 249.2, 249.4, 249.15, 249.16, 427/255.12
See application file for complete search history.

(56) References Cited

U.S. PATENT DOCUMENTS

| | | | | |
|---|---|---|---|---|
| 4,407,885 A | * | 10/1983 | Murphy et al. ............ | 442/212 |
| 4,895,108 A | * | 1/1990 | Caputo et al. | |
| 5,254,374 A | * | 10/1993 | Devlin et al. | |
| 5,382,453 A | * | 1/1995 | Mason ................... | 427/249.2 |
| 5,738,908 A | * | 4/1998 | Rey et al. ............... | 427/249.2 |
| 6,143,376 A | * | 11/2000 | Linn et al. .................. | 427/557 |
| 6,197,374 B1 | * | 3/2001 | Huttinger et al. ........ | 427/249.2 |

FOREIGN PATENT DOCUMENTS

| FR | WO95/16803 | * | 6/1995 |
|---|---|---|---|
| WO | WO 9821163 A1 | * | 5/1998 |

* cited by examiner

*Primary Examiner*—Timothy Meeks
*Assistant Examiner*—David Turocy
(74) *Attorney, Agent, or Firm*—Reed Smith LLP

(57) ABSTRACT

A process is disclosed for producing a high temperature stable fiber composite ceramic by chemical vapor infiltration (CVI) with a silicon carbide precursor in a suitable carrier gas on carbon fiber preforms or silicon carbide fiber preforms. This process is characterized by the use of a process pressure of $\geq 0.6$ bar absolute and a process temperature of $\geq 1100°$ C. Also disclosed are structural component parts, particularly for aircraft and spacecraft engineering, which are commonly exposed to high thermal and mechanical loading and which have been produced by the above process.

2 Claims, No Drawings

PROCESS FOR PRODUCING A HIGH TEMPERATURE STABLE FIBER REINFORCED CERAMIC

CROSS-REFERENCE TO RELATED APPLICATION

This application claims priority of German Application No. 101 01 546.1, filed Jan. 15, 2001, the complete disclosure of which is hereby incorporated by reference.

BACKGROUND OF THE INVENTION a) Field of the Invention

The present invention is directed to a process for producing a high temperature stable fiber composite ceramic by gas phase infiltration (CVI=Chemical Vapor Infiltration) with a silicon carbide precursor in a carrier gas suitable for this purpose, preferably on carbon fiber preforms or silicon carbide fiber preforms.

b) Description of the Related Art

Carbon fiber reinforced carbide ceramics or silicon fiber reinforced silicon carbide ceramics have not only proven to be resistant to high temperatures, but are also distinguished by low specific gravity and are therefore suitable as a material for producing thermally and mechanically loaded structural component parts, for example, for recoverable or reentry spacecraft. An example of such structural component parts is a control flap such as that provided for the X-38 experimental space glider or so-called crew return vehicles of the ISS international space station. Other areas of application are the leading edge of blades, nose cones, control rudders and heat protection paneling for spacecraft and hypersonic aircraft.

The chemical vapor infiltration method, or CVI method, for short, has been known for more than twenty years (E. Fitzer and D. Hegen, Angew. Chem. Int. Ed. Engl., 18 (1979), 295-304). It had already been determined at that time that the total deposition rate in the pores could be controlled only by the speed of the chemical reaction rather than by the transport speed in order to achieve good impregnation (see 299, op. cit., left column, first paragraph). It was concluded from this that the deposition must be carried out at low temperatures and with low concentrations. By "low temperatures" is meant temperatures below 1000° C.

Further studies in this field determined that the process temperature to be maintained needed to be adjusted to up to $900<T<1100°$ C. and the total pressure to $0.1<p<0.6$ atm (R. Naslain et al., "The Carbon-Fiber Carbon and Silicon Carbide Binary Matrix Composites. A New Class of Materials for High Temperatures Applications", Proc. ICCM 3, 3rd Intern. Conf. on Composite Materials, Paris, 1981, 1084-1097). However, it follows from the description of the experimental findings that the conditions actually applied must, in part, be appreciably below the upper limits mentioned above, namely, $900<T<1000°$ C. and $0.05<p<0.5$ atm (R. Naslain et al., "Synthesis and Properties of New Composite Materials for High Temperature Applications Based on Carbon Fibers and C-SiC or C-TiC Hybrid Matrices, Revue de Chimie Minerale", Volume 18, 1981, 544-564).

The choice of low process parameter values was based on the fact that the life span of the molecular species leading to silicon carbide (SiC) formation is increased and deposition into the depth of the pores is made possible in this way. However, such process parameters cause a very low deposition rate and, therefore, a long process period of several hundred hours for generating a matrix. Nevertheless, their necessity was emphasized again also in R. Naslain, "Fibrous Ceramic-Ceramic Composite Materials for Transport Applications", Proc. MRS Materials Research Society Meeting, Strasbourg, 1985, 99-115.

The methods according to the prior art are based on process conditions allowing the greatest possible free path length of the gaseous molecular species which takes part in the reaction leading to the deposition of silicon carbide (SiC). This is meant to ensure the penetration of the silicon carbide-forming species into the deeper zones of a fiber preform and accordingly a uniform entry of the SiC matrix over the wall thickness. However, the life of the molecular species essentially coming under consideration is very short in the temperature range to be used for the formation of SiC. This has to do with metastable fragments of starting materials such as $SiCl_2$, $SiCl_3$ or $CH_3$ from which the SiC matrix is formed in a surface reaction on a substrate and in the cavities of a fiber preform. The yield with respect to the adjusted material quantity is also correspondingly small.

This short life means an opposite effect for the steps mentioned above for promoting deep infiltration. The rate of formation of the SiC matrix is determined on the one hand by the transport of the reactive gas species which is limited by low temperature and low partial pressure of the starting material and by the impaired removal of hydrogen chloride (HCl) which is absorbed as a byproduct at the substrate surface and has an inhibiting effect on the SiC-forming surface reaction (F. Langlais, C. Prebende, Proc. 11th Intern. Conf. on Chemical Vapour Deposition, Seattle 1990, eds. K. E. Spear and G. W. Cullen, Electrochem. Soc., 686-959).

OBJECT AND SUMMARY OF THE INVENTION

Accordingly, it was the primary object of the present invention to provide conditions for a CVI process by which the disadvantages occurring in the prior art could be prevented. In particular, very good infiltration results, i.e., material characteristics, should be achieved under such conditions while substantially shortening the required process duration at the same time and therefore making a large-scale production process more economical.

Surprisingly, this object could be met according to the invention by a process for producing a high temperature stable fiber composite ceramic by chemical vapor infiltration (CVI) with a silicon carbide precursor in a suitable carrier gas on carbon fiber preforms or silicon carbide fiber preforms, wherein the process is wherein the process pressure is adjusted to $\leq 0.6$ bar absolute and the process temperature is adjusted to $\leq 1100°$ C.

When the infiltration process is carried out at a temperature of 1100° C. or above and at a pressure of more than 0.6 bar absolute and above, results are achieved which were entirely unexpected in view of the teaching of the prior art. The deposition of the SiC matrix in an 8-mm thick laminate of plain-woven carbon fiber fabric with a fiber volume content of 43% from both sides to a depth of 4 mm, that is, to the center of the laminate, was completely successful. Material characteristics comparable to those of a material obtained by known methods with a process duration of several weeks were achieved with a process duration of only 80 hours.

This is all the more surprising in view of the fact that the essential process conditions such as process pressure and process temperature far exceed the values recommended in the prior art. The higher process pressure of 0.6 bar absolute and above does not reduce the depth infiltration that is required and aimed for; rather, the reaction rate of the thermally activated deposition process is increased through the increase in available material in connection with the increased process temperature, and desorption of the inhibiting HCl byproduct is accelerated.

It has proven advantageous to adjust the process pressure to between 0.6 bar absolute and 1.25 bar absolute and the process temperature to between 1100° C. and 1200° C. However, in this connection it should be stated that the upper limit of the process pressure is essentially determined by the type of CVI system in use and higher pressures can therefore also be applied.

The precursor to be used should contain silicon and carbon in a ratio which allows a SiC deposition as far as possible without simultaneously occurring impurities. In particular, it must be easily vaporizable. For example, silicon tetrachloride ($SiCl_4$) could be used together with methane ($CH_4$).

According to the invention, however, chloro(alkyl)silanes are preferably used as starting materials for the SiC deposition because, in this case, for one, silicon and carbon are contained in the molecule in a ratio suitable for the SiC deposition and at least byproducts in the form of tarry substances can interfere with the matrix formation. However, it is most preferable to use methyltrichlorosilane (MTS) because, in this case, silicon and carbon are present in the molecule in the correct stoichiometric ratio for SiC formation. In every case, however, hydrogen is used as carrier gas, which also takes part in the reaction by reducing intermediary stages from the decomposition of methyltrichlorosilane accompanied by the formation of hydrogen chloride (HCl) and shifts the reaction in favor of the formation of the matrix. The hydrogen chloride that is formed is expelled through the increased temperature and accordingly does not impede the SiC deposition.

It has also proven advantageous for the process according to the invention to adjust a partial pressure ratio of hydrogen to methyltrichlorosilane between 4 and 8. Even without increasing the temperature, good results were achieved in this case with respect to compaction (matrix formation) by the higher MTS partial pressures.

Further, it is very advantageous when a heat-resistant material with a large surface on which the process gas is conditioned by a pre-reaction is arranged between the gas feed in the reaction space and the fiber scrims to be infiltrated. Namely, it has turned out that process gas that has not been pre-reacted causes a rapid deposition on the outer surfaces of the fiber scrim and accordingly causes a sealing of its access pores. The reason for this is the presence of thermally unstable molecular species, primarily products with a high silicon content, which form immediately after the still cool process gas enters the reaction space and which have only a short life span at the process temperature. These molecular species react on the large-surface heat-resistant material. Only molecular species with a long life reach the fiber scrim to be infiltrated and enable the deposition of silicon carbide deep into the fiber scrim.

As a rule, a carbon fiber felt which has a thickness of about 20 mm and is wound around the gas feed tube that is provided with holes along its length is used as heat-resistant material with a large surface.

Tests have shown that a temperature range of 1100 to 1200° C. combined with a process gas pressure between 0.6 bar absolute and 1.25 bar absolute and in connection with an $H_2$/MTS partial pressure ratio of 4 to 8 delivers the best infiltration results. When the above-mentioned conditions are set, a wall thickness of 4 mm, typical of the relevant structural component parts for spacecraft, with a fiber proportion of 42-44 volume percent, preferably with a 0°/90° laying angle, can be infiltrated within 25 to 40 hours to a density which imparts the following characteristics to the C/SiC composite structural component parts generated in this way:

| | |
|---|---:|
| density | 1.8-2.1 g/cm |
| tensile strength | 300-330 MPa |
| elongation at break | 0.7-1.0% |
| modulus of elasticity | 50-80 GPa |
| flexural strength | 350-450 MPa |
| interlaminar shear strength | 25-35 MPa |

Material characteristics of this type completely satisfy the requirements of use.

The infiltration is preferably carried out until a residual porosity of 12 to 15 volume percent is adjusted, a feature that is suitable for most of the application purposes under consideration. This feature can also be adjusted by means of the indicated process parameters with a substantially shortened process duration.

Within the framework of the process according to the invention, preforms of carbon fibers or silicon carbide fibers are initially produced by constructing fiber layers and fixing the fiber layers one above the other at a distance from one another by binders, possibly accompanied by simultaneous molding and stabilization of the preform approximating the desired end product.

It is advantageous for the purposes of application under consideration to produce the fiber layers with a 0°/90° laying angle.

Organic and/or silicon-organic polymers are advantageously used as binders. Under the infiltration conditions mentioned above, they form solid residues comprising carbon or SiC and therefore do not impede the construction of the ceramic. The binder can be applied to the fiber fabric or scrim in conventional manner by spraying, sprinkling, rolling or dipping (prepregs).

The high temperature-stable fiber composite ceramics produced in accordance with the invention are excellent materials for producing structural component parts, particularly for applications in the fields of aeronautic and aerospace engineering. Within the framework of the present invention, it is intended in particular for control flaps, leading edges of blades, nose cones, control rudders or heat protection paneling for orbital gliders and hypersonic aircraft. Many of these structural component parts are hot in places, reaching a temperature of up to 1800° C., for example, when entering the earth's atmosphere or due to the high flying speeds and are accordingly mechanically loaded to a considerable degree in part.

Because of their amorphous structure, silicon carbide fibers have a substantially lower temperature resistance than carbon fibers and lose their strength quickly above about 1000° C. Therefore, short process times are critically important for achieving an efficient SiC/SiC composite material. SiC fibers in a composite ceramic with SiC matrix (SiC/SiC ceramic) have proven successful for tribological applications, for example, pump bearings.

The present invention provides materials having the high-temperature stability and lightness required for this area of application. Due to the selected process conditions, they can be produced in a considerably shorter time and therefore more economically.

DESCRIPTION OF THE PREFERRED EMBODIMENTS

1. Production of semifinished products for bearing sleeves made from SiC/SiC

A tube with a length of 700 mm, an outer diameter of 120 mm and a wall thickness of 5 mm was produced from a fabric web of SiC fibers by winding on a tape winding machine. The fabric layers of the fabric web were fixed together by a binder.

After thermal treatment for stabilizing the bonding of the layers, the fabric tube (preform) was placed on a fastening mandrel in the CVI installation without further arrangement and the fibers were initially coated with carbon. The temperature in the reaction space was then brought to 1200° C. for infiltration with the SiC matrix, and a process gas comprising methyltrichlorosilane (MTS) and hydrogen $H_2$ in a ratio of 1:4 was introduced in a flow of 42 l/min, wherein the process gas pressure was set slightly above atmospheric pressure. The SiC infiltration was concluded after 22 hours by evacuating and turning off the heating flow and flooding with argon. The product of this process was a tube of SiC/SiC composite ceramic with 42 volume percent fibers, a density of 2.3 g/cm$^3$ and a flexural strength of 420 MPa. It was used as a semifinished product for bearing sleeves which were produced by dividing up the tube and subsequent outer and inner machining of the portions with diamond tools on a cylindrical grinding machine.

2. Production of semifinished products for bearing parts made from C/SiC

A tube having a length of 600 mm, an outer diameter of 45 mm and a wall thickness of 8 mm was produced on a tape winding machine from a fabric web which was produced from carbon-coated carbon fibers and to which a binder was applied. The binder for binding the layers to one another was strengthened by thermal treatment so as to generate a preform with handling stability and with fixed distances between layers.

This tube preform was inserted into the CVI installation as in Example 1. The reaction space was brought to a temperature of 1100° C. and a mixture of MTS and $H_2$ in a ratio of 1:8 was introduced as process gas and was maintained at a pressure of 0.6 bar absolute in a volume flow of 25 l/min by means of a pump with a regulating valve. A C/SiC tube with a density of 2.0 g/cm$^3$ and a fiber content of 43 volume percent was produced by the process which was concluded after 80 hours. The material showed a flexural strength of 450 MPa.

Elements for a sliding bearing for use in a control flap for a recoverable spacecraft (corresponding to German Patent 198 10 067.1) were produced from this material by cutting out tube portions and by outer and inner grinding. In order to protect the carbon fibers from oxidation by the air plasma occurring during reentry, these elements were coated with SiC by chemical vapor deposition (CVD) and its sliding surfaces were subsequently subjected to fine machining.

3. Production of components for control flaps of C/SiC

For a control flap according to the German Patent mentioned in Example 2, the basic elements of the flap body were produced in the following way:

Sections were cut from a fabric web that was woven from carbon-coated carbon fibers and to which a binder substance was applied, and box-shaped elements with a length of from 1.2 m to 1.6 m and a width of about 0.4 m, each with crosspieces for strengthening, were produced from the sections by manual laminating and compaction in the autoclave. The average wall thickness was 4 mm. The binder was cured by thermal treatment, so that the structural component parts were stabilized for further handling and the fabric layers were fixed at the desired distance for a fiber volume of 42%. The structural component parts were positioned in the reactor space of the CVI installation on simple graphite suspensions having only punctiform contact with the structural component parts. After evacuation and flooding with inert gas, heating was carried out to a process temperature of 1150° C. and the reaction gas comprising MTS and $H_2$ was introduced in a ratio of 1:6 with a total flow of 35 l/min at a pressure of 0.85 bar absolute and the process was carried out for 40 hours under these conditions.

C/SiC structural component parts for control flaps having a density of 1.9 g/cm$^3$ (lower than in the structural component parts of Examples 1 and 2 due to the higher carbon proportion from the binder) and flexural strength of 350 MPa were produced in this way. The structural component parts were machined to size in additional work steps, surface-ground and then coated with SiC by means of chemical vapor deposition (CVD) to protect against oxidation.

While the foregoing description and drawings represent the present invention, it will be obvious to those skilled in the art that various changes may be made therein without departing from the true spirit and scope of the present invention.

What is claimed is:

1. In a process for producing a high temperature stable fiber composite ceramic by chemical vapor infiltration (CVI) with a methyltrichlorosilane (MTS) in hydrogen ($H_2$) on fiber scrims of carbon fiber preforms or silicon carbide fiber preforms, wherein the partial pressure ratio of hydrogen to methyltrichlorosilane is adjusted between 4 and 8, the process further comprising:

adjusting the process pressure to $\geq 0.6$ bar absolute;

adjusting the process temperature to $\geq 1100°$ C.; and arranging a heat-resistant material with a large surface between a gas feed in the reaction space and the fiber scrims of carbon fiber preforms or silicon carbide fiber preforms to be infiltrated for pre-reacting the methyltrichlorosilane on contact with the large surface of the heat-resistant material, and wherein the carbon fiber preforms or silicon carbide fiber preforms are generated in that fiber layers are first constructed, the fiber layers are fixed one above the other at a distance from one another by binders and then simultaneously molding and stabilizing the preform approximating a desired end product.

2. The process according to claim 1, wherein the binder is selected from organic and/or silicon-organic polymer resins.

* * * * *